United States Patent Office 2,965,441
Patented Dec. 20, 1960

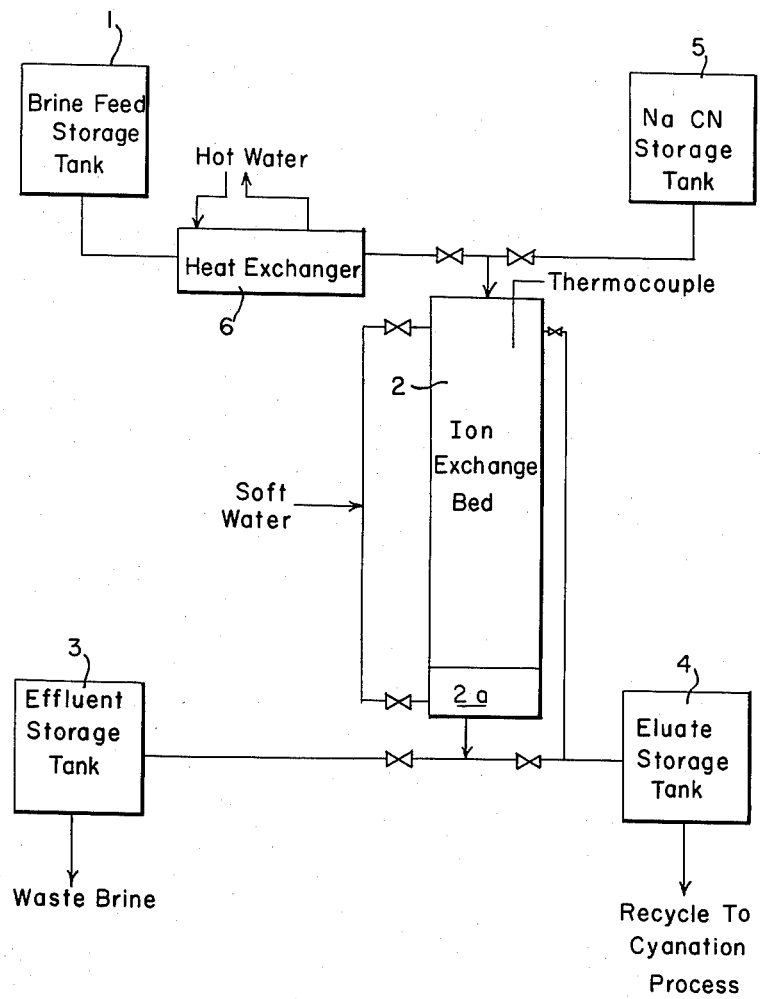

2,965,441

ION EXCHANGE FOR THE RECOVERY OF CHEMICALS

Donald Eldon Welton, Victoria, Tex., assignor to E. I. du Pont de Nemours and Company, Wilmington, Del., a corporation of Delaware Filed Nov. 29, 1956, Ser. No. 625,028

6 Claims. (Cl. 23—79)

This invention relates to a process for the recovery of copper from waste brines and is more particularly related to an ion exchange process for the recovery of cuprocyanide complexes from dicyanobutene synthesis extracts.

The use of ion exchange systems has offered convenient and economical solutions to many purification and disposal problems and in some cases ion exchange resins have been used to purify and recover chemicals. Treatment of cyanide-containing solutions has not been generally successful, however, and according to E. B. Tooper, is not feasible for the recovery of metals from metal cyanide plating baths, "Plating," November 1955, pp. 2–6. The possibility of using an anion exchange resin for the recovery of gold has been demonstrated, S. N. Sussman, F. C. Nachod and W. Wood, Ind. & Eng. Chem. 37, 618 (1945), and F. H. Burstall et al. in a paper on "Ion Exchange Process for Recovery of Gold from Cyanide Solution," Ind. & Eng. Chem., vol. 45, pp. 1648–58 (1953). The latter paper covers an investigation into the absorption of gold, silver, copper, zinc, and other metals from cyanide solutions, on strongly basic resins.

An object of the invention is to recover copper by an anion exchange process. Another object is to convert a cuprocyanide complex-containing brine to a condition favorable for absorption of copper-containing ions by ion exchange resins. Yet another object is to provide methods of recovering concentrated cuprocyanide solutions and of regenerating a copper cyanide-rich anion exchange resin. Other objects and advantages of the invention will hereinafter appear.

The invention relates to the recovery of copper from a brine extract of the synthesis reaction mixture from the cyanation of halogenated butenes. By the cyanation process dicyanobutene is produced from halogenated butenes and aqueous solutions of sodium cyanide and hydrocyanic acid. The cyanation process is initiated especially by cuprocyanide complex catalysts and by processes such as those described in U.S. Patents 2,451,386; 2,477,573; and 2,477,597.

In the aforesaid and like processes, efficient operation requires that the copper catalyst be recovered after the reaction. The bulk of the catalyst is separated, in accord with the preferred embodiment of the invention, from the reaction mixture by extracting that mixture with benzene, the dicyanobutene being recovered in the benzene phase, the copper catalyst in the aqueous brine phase. Upon separation of the phases, the major part of the copper in the extracted aqueous brine phase is precipitated with hydrochloric acid and recovered by concentration in a suitable thickener. The recovered concentrated catalyst is recycled to the cyanation process and the filtrate brine from the thickening operation which contains up to about 1,000 p.p.m. of dissolved copper, principally as a cuprocyanide complex, is recovered by anion exchange.

During the precipitation of the extracted brine with hydrochloric acid, the cuprocyanide complex present as an alkali metal salt decomposes to cuprous cyanide, sodium chloride and free HCN. The filtrate brine contains these constituents together with other by-products of the cyanation reaction and this brine is subjected to copper recovery by absorption on a strongly basic anion exchange resin.

By the preferred feature of the invention, the aforesaid filtrate brine is treated with hydrochloric acid until a pH of about 1.5 plus or minus 0.5 has been reached. At a pH of greater than about 1.5 it has been found that additional CN⁻ remains complexed with the copper as anions of increased valence charges compared to that at the preferred pH. Ion exchange resins have a limited number of ionic sites available for exchanging ions and the amount of copper that can be absorbed per unit of resin will therefore be relatively smaller as the charge of the copper-containing ions increases. At a pH of less than about 1.5, hydrochloric acid combines with cuprous cyanide to produce the complex, $H_n(CuCNCl_n)$, where $n$ may be 1–3. This type of complex is not as readily ionized to a copper-containing anion as is its sodium cuprocyanide counterpart. Not only is the capacity of the resin diminished but the copper leakage increases because of the amount of non-ionized complex present. At a pH of 0.5, for example, copper leakage will average 150 p.p.m. as compared to 20 p.p.m. at a pH of about 1.5.

From the aforesaid, it is evident that the optimum pH for the recovery of copper should be close to a pH of 1.5, although it may vary from that pH by as much as plus or minus 0.5. The greater the deviation from the optimum, however, the less efficient will be the copper separation.

The complex copper cyanide anion is readily absorbed on strongly basic anion exchangers containing a quaternary amine group, $R_4N^+$, R being an organic radical, which exerts a strong attraction for anions when used as a chloride salt, $R_4N \cdot Cl$. The absorbed complex cuprocyanide anion is released from the resin by an aqueous alkali metal cyanide solution (the solution containing the released cuprocyanide anion is called the eluate), converting the resin to the cyanide form, $R_4N \cdot CN$. The cyanide in the resin can then be displaced and the resin reconverted to the original chloride form by treatment with an aqueous alkali metal chloride solution.

The absorption takes place in accord with this equation, where X=Cl⁻ or CN⁻, $R_4N$ is a point within the ion-exchange matrix, and $n$ is a positive integer:

$$nR_4N \cdot Cl + (CuCN \cdot X_n)^{n-} \rightarrow (nR_4N)CuCN \cdot X_n + nCl^-$$

During the elution of the resin, the copper complex anion in the resin is replaced with the CN⁻ group and an aqueous cuprocyanide solution is formed.

$$(nR_4N) \cdot CuCN \cdot X_n + (n+3)CN^- \rightarrow n(R_4N \cdot CN) + Cu(CN)_4^- \cdot nX$$

The resin is reconverted to its chloride form when the first volume of the filtrate brine feed provides the excess chloride ion required for regeneration.

$$R_4N \cdot CN + Cl^- \rightarrow R_4N \cdot Cl + CN^-$$

The strong base resins thus function as salt splitters in these operations and will convert one salt to another by ion exchange.

The elution of cuprocyanide from the cuprocyanide-rich resin after breakthrough, i.e. when the effluent begins to increase in copper-containing anions, is accomplished by the use of an aqueous solution containing an alkali metal cyanide. The agent is used at a concentration between 5 N–7 N, and, for optimum operation, at about 6 N–7 N aqueous solution of the cyanide. The sodium cyanide eluant converts the resin to its cyanide form, $R_4N \cdot CN$. In this form it is not effective in removing cuprocyanide from brine solutions. However, the cyanide is readily displaced by chloride when 1–5 N brine is passed through the resin, regenerating the resin chloride and forming aqueous sodium cyanide. When the cyanide has been eluted from the bed, the resin can be used again to absorb the cuprocyanide complex from its acidic brine solution. The cycle of absorption, elution, and regeneration can be repeated many times with but a slight diminution in the absorptive capacity of the resin. Although not necessary to the satisfactory operation of the process, a water wash of the resin bed before and after the sodium cyanide elution, has been found desirable to prevent darkening of the products from formation of a small amount of HCN polymer. This polymer forms if HCN is present while the bed is in the intermediate pH range of 8–10.

The drawing, which is in the form of a diagrammatical flow sheet, illustrates a preferred method by which the process of the invention can be conducted. The major equipment pieces that are used include feed tank 1, ion exchange unit 2, effluent tank 3, eluate weight tank 4, sodium cyanide storage tank 5, and heat exchanger 6.

An effective ion exchange unit consisted of a 4-ft. length of standard 3″ diameter borosilicate glass pipe 2 provided with a thermocouple well, inserted in the top 6″ of the resin disposed in the vessel 2. This thermocouple was employed to measure the bed temperature during operation and during regeneration. The ion exchange resin was supported on glass wool backed on ceramic rings 2a. Glass wool at both top and bottom of the column was employed to prevent fines from leaking from the column.

The anion exchange process was conducted by charging the filtrate brine obtained from dicyanobutene synthesis, as described, into feed tank 1. Typical filtrate brines had these compositions:

| | |
|---|---|
| NaCl | 20–25%. |
| Total CN⁻ | 0.1–0.5%. |
| HCN | 0.1–0.5%. |
| Organics | 0.05%–0.15% (chloroform extractables). |
| Copper | 400–1000 p.p.m. |
| Manganese | 5–10 p.p.m. |
| Iron | 0–10 p.p.m. |
| pH | 1.5 (varied from 0.5 to 2.5). |
| Benzene | 0–10 p.p.m. |

The filtrate brine was allowed to flow from the feed tank 1 by gravity into the ion exchange unit (2) after passing through heater 6 in which the feed was usually heated to a temperature of about 40° C., although the temperature ranged between 30° C. and 75° C. The resulting warm brine was passed downflow, at rates of 0.6–1.2 g.p.m./cu. ft. of resin, through the ion exchange resin in unit 2 containing approximately 0.15 cu. ft. of resin. The effluent contained less than 50 p.p.m. of copper, was cooled and weighed in effluent tank 3.

Feed brine was analyzed for copper and checked for pH each time the feed tank was replenished. Effluent brine was analyzed for residual copper every two hours until the breakthrough point was reached, when the frequency was increased to every hour. The breakthrough point is the point at which the capacity of the resin approaches exhaustion and copper leakage rises sharply.

When the ion exchange resin was found to have become exhausted, the brine feed was discontinued. Then a 20 to 28% aqueous sodium cyanide solution from storage tank 5 was passed downflow through the resin to dissolve the absorbed copper salts. The eluate was cooled and weighed in eluate weight tank 4, the eluate being sampled for copper analysis. (The eluate is the sodium cyanide-cuprous cyanide solution after it has passed through the exchange resin.) It was found that over 95% of the copper was eluted in the first two or three bed volumes and substantially complete elution was obtained in five to six bed volumes.

The heat of reaction for copper cyanide and sodium cyanide is 24,800 B.t.u./lb. mole of CuCN. Because of this, considerable heat is evolved during the elution of the ion exchange resin with sodium cyanide. A maximum temperature of 85–95° C. was normally obtained during the second volume of eluate. The duration of the high temperature was short, however, and had no apparent effect on resin capacity or life.

Upflow regeneration is generally used for ion exchange units. Backwashing expands the resin bed, prevents channeling on the next cycle, and washes out insoluble materials which may collect on the upper surface of the bed. Upflow elution with sodium cyanide proved to be impractical, however, since there is very little difference in the densities of the resin and the eluate and the resin would float at a backwash rate equivalent to only 0.01 g.p.m./cu. ft. of resin. With downflow elution of the ion exchange bed, rates of 0.3 to 0.6 g.p.m. sodium cyanide solution/cu. ft. of resin were readily achieved. Since downflow did not disturb the bed, it was found desirable to incorporate a period of upflow operation during part of the cycle, otherwise channeling and high copper leakage were experienced during the next operating cycle. Soft water was found to be suitable for this portion of the process, due to its lower density compared to the resin. After the required amount of sodium cyanide was passed through the unit, the bed was washed downflow with soft water to displace the salts and decrease the density of the aqueous phase. A backwash of soft water was then used to expand the bed. There was no floating or loss of resin as it was heavier than the water. When the proper amount of free space was left in the column for bed expansion, water rates as high as 2 g.p.m./cu. ft. of resin were used without any carryover of resin out the top of the column.

After the elution and washing operations just described, the resin bed was in the cyanide form, $R_4N \cdot CN$. Regeneration of the resin chloride, $R_4N \cdot Cl$ was found to be necessary before the bed would again absorb cuprocyanide from acidic brine solution. This could readily be achieved by passing an aqueous alkali chloride solution downflow through the bed until cyanide was substantially absent in the effluent. Decopperized filtrate brine which had previously been treated by the ion exchange process could be used for this purpose, but it was more convenient for the cyanation synthesis process to use the normal feed of untreated copper-containing filtrate brine and separate the initial high copper effluent from the subsequent treated brine. Only one or two bed volumes of brine were ordinarily required to complete the regeneration of the resin and yield an effluent containing less than 50 p.p.m. of copper. The copper-containing effluent brine could be conveniently recycled to other parts of the cyanation synthesis process. This point marked the end of a complete cycle and subsequent filtrate brine effluent remained low in copper until the bed was again exhausted and another elution and regeneration was necessary.

The table which follows gives results obtained by operating the process just described with filtrate brine having the analysis shown above.

Table

| Flow Rate, g.p.m./cu.ft. of Resin | No. of Cycles | Average Cu leakage to breakthrough, p.p.m. Cu | Average resin cap., lbs. Cu/lb. Resin | Average pH of Feed |
|---|---|---|---|---|
| 0.6 | 9 | 25 | 0.124 | 1.77 |
| 0.85 | 12 | 31 | 0.114 | 1.34 |
| 1.00 | 11 | 33 | 0.109 | 1.43 |
| 1.20 | 3 | 32 | 0.086 | 1.58 |

Any suitable, strongly basic ion exchanger, such as the Amberlite IRA—400 resin of the Rohm and Haas Corporation, and anion-active resins of the formalinurea-triethanolamine-type, as described in U.S. Patent 2,485,485 of J. J. R. Dudlig, may be used, and especially those that contain a quaternary amine group. It has been established that such exchangers assert a strong attraction for complex cuprocyanide ions.

The acidity of the filtrate brine necessitates the use of corrosion-resistant materials of construction for the ion exchange unit, storage tanks, pipe lines, etc. Glass or glass-lined steel proved to be satisfactory materials of construction for these uses, although titanium is also satisfactory.

I claim:

1. In a process for the recovery of copper from the filtrate brine of a dicyanobutene synthesis, the steps which comprise acidifying a cuprocyanide ion containing brine of the dicyanobutene synthesis with an inorganic acid to a pH below about 2.5 but within a pH sufficiently high to leave no more than about 150 p.p.m. of copper in the effluent from the ion exchange, passing the acidified brine through an anion exchange resin, separating the absorbed copper from the resin by elution with an aqueous alkali metal cyanide solution, displacing the cyanide ion on the resin with a chloride ion from an aqueous brine and when the cyanide has been eluted from the resin repeating the steps.

2. The process of claim 1 in which the brine prior to being subjected to anion exchange has a pH between 1.0 and 2.0.

3. The process of claim 1 in which the brine prior to being subjected to anion exchange contains from 400 to 1000 p.p.m. of copper.

4. The process of claim 1 in which the brine subjected to ion exchange for copper recovery is obtained from a reaction mixture of the cyanation of halogenated butenes after the separation of dicyanobutene by benzene extraction.

5. The process of claim 1 in which the eluting agent is a 20 to 28% by weight aqueous solution of sodium cyanide.

6. In a process for the recovery of copper from the filtrate brine of the dicyanobutene synthesis, the steps which comprise acidifying a cuprocyanide ion containing brine, containing between 400 and 1000 p.p.m. of copper, of the dicyanobutene synthesis with an inorganic acid to a pH below about 2.5 but within a pH sufficiently high to leave no more than about 150 p.p.m. of copper in the effluent from the ion exchange, clarifying the acidified brine and passing the resulting brine, as the influent, through an anion exchange resin until copper breakthrough, stopping the flow of influent, passing an aqueous alkali cyanide solution through the copper-rich resin until the effluent is substantially copper-free, displacing the cyanide anion of the resin with a chloride anion, and thereafter repeating the steps.

References Cited in the file of this patent

UNITED STATES PATENTS

| | | |
|---|---|---|
| 2,157,511 | Urbain et al. | May 9, 1939 |
| 2,397,575 | Tiger et al. | Apr. 2, 1946 |
| 2,557,258 | Calkins | June 19, 1951 |
| 2,680,761 | Halliwell | June 8, 1954 |

OTHER REFERENCES

Myers: "Ion Exchange Resins," Ind. and Eng. Chem., August 1943, pages 858–862.

Ind. and Eng. Chemistry, vol. 45, No. 8, August 1946, pp. 1648–1658.